United States Patent [19]
Pierce

[11] 3,911,556
[45] Oct. 14, 1975

[54] CONTAINER FILM CUTTING ASSEMBLY
[75] Inventor: Joseph E. Pierce, Allentown, Pa.
[73] Assignee: Dart Industries Inc., Los Angeles, Calif.
[22] Filed: Mar. 14, 1975
[21] Appl. No.: 558,613

Related U.S. Application Data
[62] Division of Ser. No. 492,561, July 29, 1974.

[52] U.S. Cl. .......................... 29/558; 82/1 C; 82/47; 82/101; 83/914
[51] Int. Cl.² .......................................... B26D 9/00
[58] Field of Search .................. 83/42, 46, 48, 914; 82/1 C, 46, 47, 82, 70.2–77, 92, 101, 102; 425/302 B, 305 B; 408/19, 30, 104, 110; 29/33 A, 565, 566, 558

[56] References Cited
UNITED STATES PATENTS

| | | | |
|---|---|---|---|
| 692,712 | 4/1902 | Rose | 408/110 |
| 1,290,874 | 1/1919 | Baker et al. | 408/104 |
| 3,765,785 | 10/1973 | Humphreys | 83/914 X |

*Primary Examiner*—J. M. Meister
*Assistant Examiner*—Fred A. Silverberg

[57] ABSTRACT

An assembly for cutting and trimming a web of plastic film secured about the top of successive containers moving on an endless conveyor. Opposing clamps engage the top outer periphery of the container and provide support for a rotating cutter device. The cutter device includes a lower pressure ring connected by compression springs to a top support plate. The top support plate is secured to a rocker arm system which moves the device up and down over the container top. The spring mounted lower pressure ring operates to pin the film against the clamps while a concentrically mounted rotating bar having a downwardly extending knife blade at one end cuts the film radially outside the top edge of the container. The top support plate also includes a knife blade secured to one side thereof which severs the film web transversely of its length to separate the trimmed container from subsequent containers.

2 Claims, 5 Drawing Figures

CONTAINER FILM CUTTING ASSEMBLY

This is a division of application Ser. No. 492,561, filed July 29, 1974.

BACKGROUND OF THE INVENTION

1. Field of the Invention

The present invention relates to film cutting systems and, more particularly, to an assembly for trimming and severing a continuous web of film from the outer periphery of a container opening.

2. Description of the Prior Art

In general, prior art systems for cutting films heat sealed or otherwise secured to the open top of containers utilized stationary blades. Since such blades did not move, they had to be continuous in length and of the exact configuration of the desired cut. Obviously, blades of this nature were costly to construct, difficult to maintain in a sharp condition, and require complicated blade mounting systems. Oftentimes, the blade mounting system costs more than the blade itself.

An additional problem with severing films is the generally flimsy character of the film creating difficulty in piercing the film and effecting an accurate cut. Without support, typical thin films are not readily pierced and, in fact, tear and form ragged edges when subjected to the severing action of a knife blade.

Hot wire systems are frequently used but these do not make accurate cuts and they leave an uneven edge on most thermoplastic materials due to heat shrinking. Also such systems require elaborate insulative support means which detract from their use on assembly lines.

SUMMARY OF THE INVENTION

The present invention provides a cutting assembly for severing and trimming a continuous web of film material from about the top of a container. The invention is especially adapted for use on a high volume production line where successive containers are moving on a conveyor with a web of film secured across the top of each container. A pair of grooved support clamps move to encircle the top of each container as it moves intermittently into the film cutting assembly. A cutting means having a spring mounted lower pressure ring pivots downwardly to hold the film against the support clamps. About simultaneous therewith, a rotating bar positioned concentric within the pressure ring and having a knife blade, spins the blade through the film around the outer edge of the container opening. The cutting means is also equipped with a stationary knife for cutting the film transversely of its length to separate the trimmed container from subsequent containers.

DESCRIPTION OF THE PREFERRED EMBODIMENT

Figure 1:
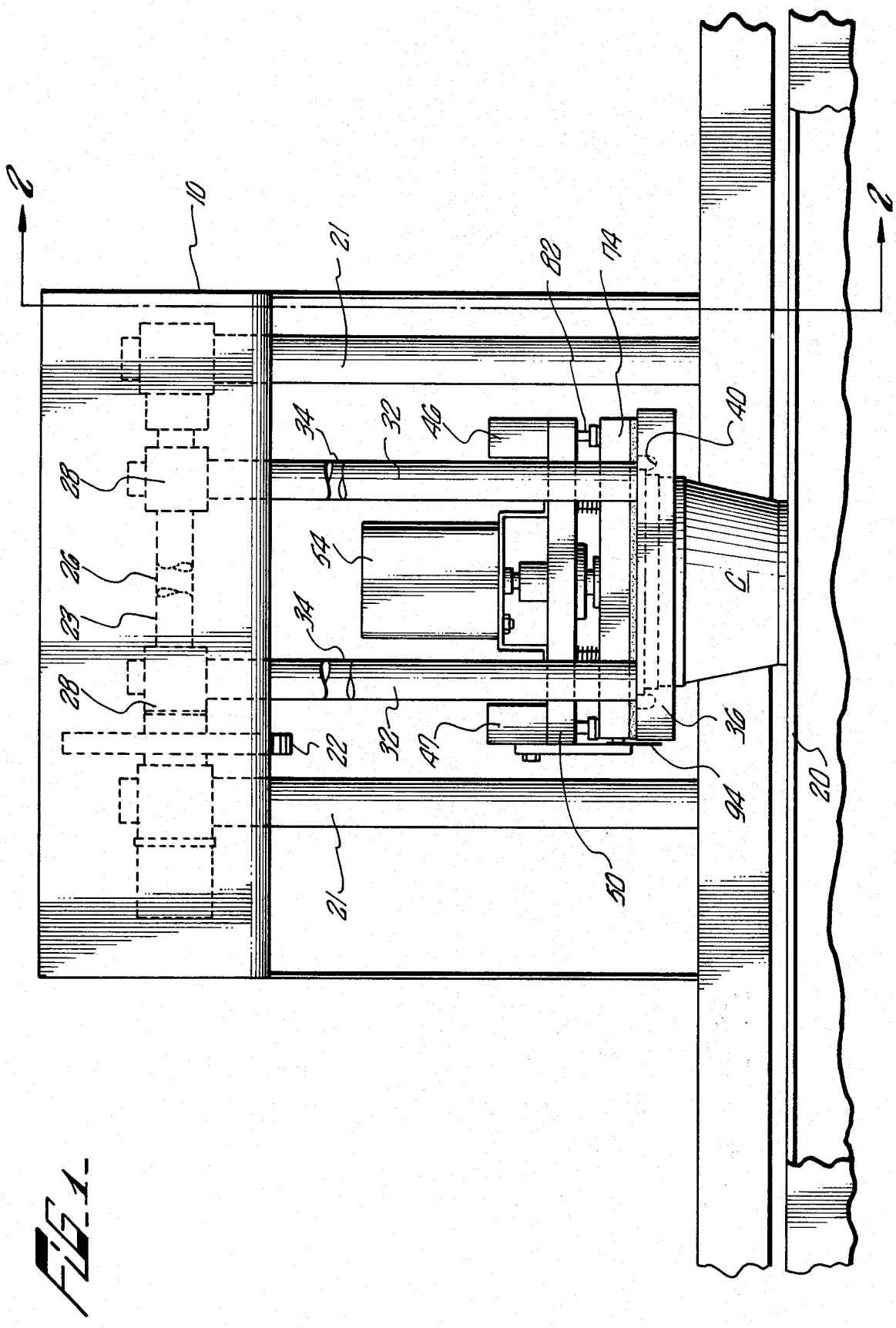
FIG. 1 is a front elevation view of the film cutting assembly of the present invention shown in the down position.
Figure 2:
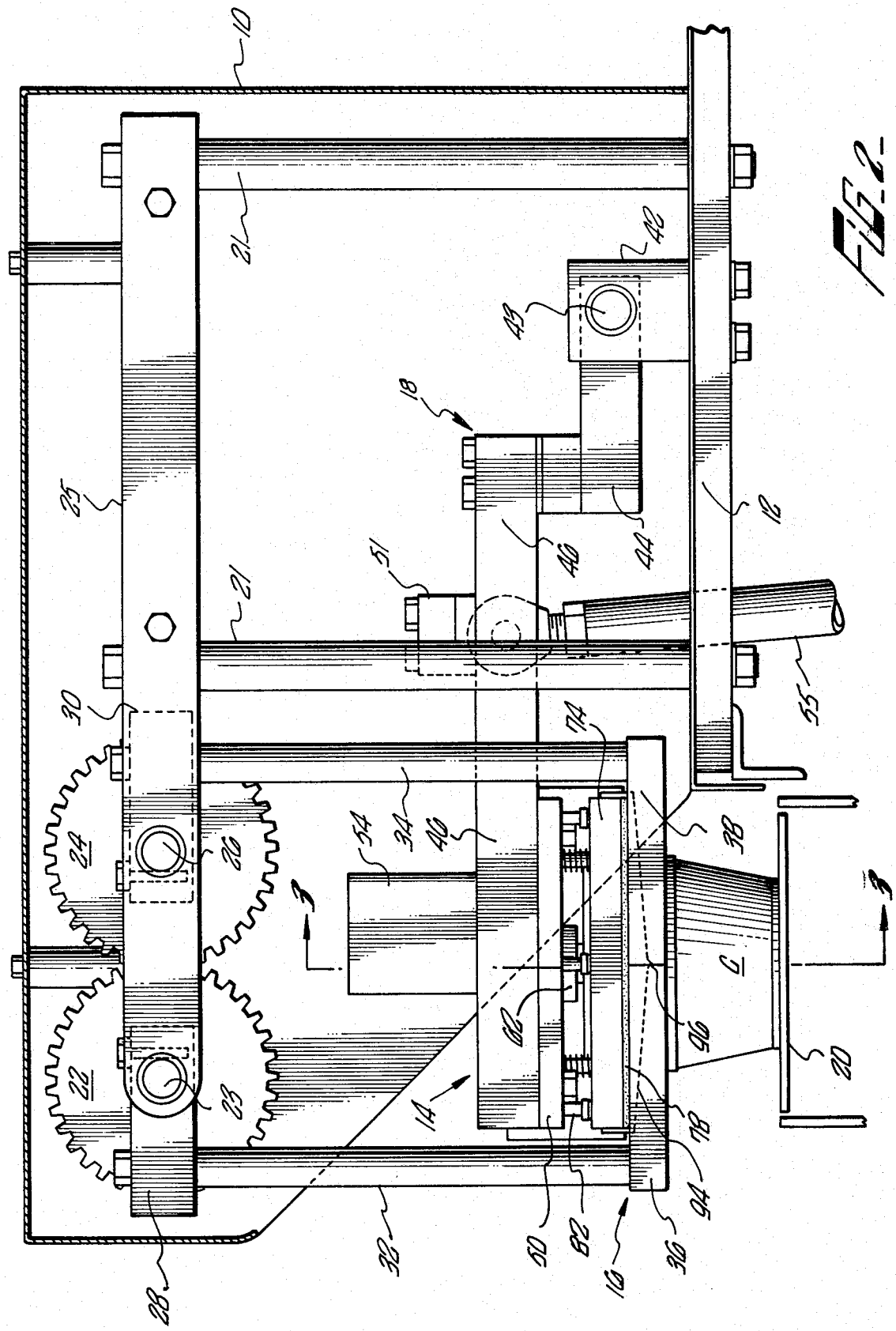
FIG. 2 is a sectional elevation view taken along the line 2—2 in FIG 1.

Referring now to FIGS. 1 and 2 of the drawings, the film cutting assembly is shown partially enclosed with an outer housing 10 and mounted upon frame 12. The invention includes essentially two co-acting apparatus defined generally as a cutting means 14 and a swinging support clamp mechanism shown generally as 16.

Initially, a container shown as C moves on a conveyor shown generally as 20 to a position beneath the overall cutting assembly. (At this point it is contemplated that the container has been filled with a foodstuff, article or the like, and has had a continuous web of film secured over the container opening.) In this position spur gears 22,24 are activated to rotate by a drive means not shown. The spur gears are located such that their teeth intermesh in a manner to cause the rotation of both when one is rotated. The gears are mounted for rotation on the horizontal frame member 25 which are secured to frame 12 by vertical frame members 21. Each gear is provided with a central shaft 23,26 which is journaled to the horizontal frame member 25.

Also secured to the shafts are two pairs of pivot arms 28 and 30 to which are connected two pairs of swing arms 32,34, respectively. The lower end of each pair of swing arms are connected to support clamps 36,38. The support clamps closely encircle the outer top portion of the container. In the preferred embodiment each clamp has a semi-circular configuration and, when placed in abutting contact with each other (closed position) form a ring-like structure about the outer periphery of the container top. The support clamps are also provided with a recess 40 which, when the clamps are in a closed position, as shown in FIGS. 1–4, an annular groove is formed closely adjacent the container top and concentric with the configuration thereof. the annular groove is of a depth sufficient to provide for a knife blade to be inserted and orbit around in a manner to be described hereinafter.

When the clamp supports have encircled the top of the container, the rocker arm system is activated to move the cutting means 14 into its down position over the clamps. The rocker arm system, shown generally as 18, includes a pair of shaft support members 42 (only one is shown) secured to the frame 12. The shaft support members have journaled thereto a shaft 43 which is connected to a pair of rotatable link arms 44 (only one is shown). The link arms are secured to a pair of rocker arms 46,47. The rocker arms are fixedly attached to a top support plate 50 of the cutting means. Extending across the rocker arms is a rod support block 51 to which is rotatably attached a connecting rod 55. The connecting rod transmits up and down motion to the cutting device through the pivoted rocker arms via a cam drive means not shown. It should be noted that only one rocker arm could be used. In such case, it could be directly pivoted to shaft 43 without the offset link and support members.

Secured to the top support plate is a cover 52 and cutter drive means 54. This is preferably an electric motor or the like. The drive means 54 includes a drive shaft 56 and gears (not shown).

Figure 3:
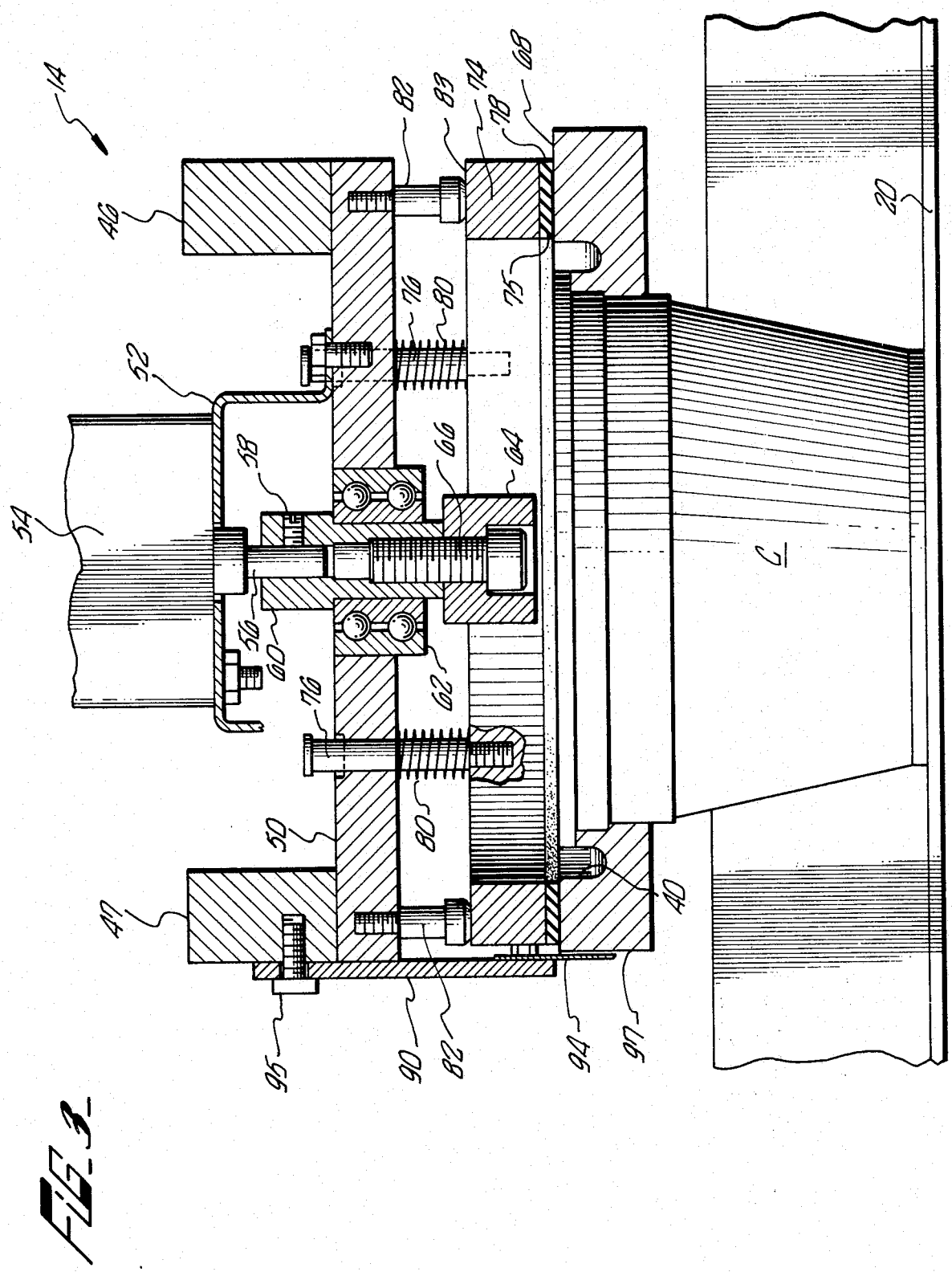
FIG. 3 is a sectional elevation view taken along the line 3—3 in FIG. 2.
Figure 4:
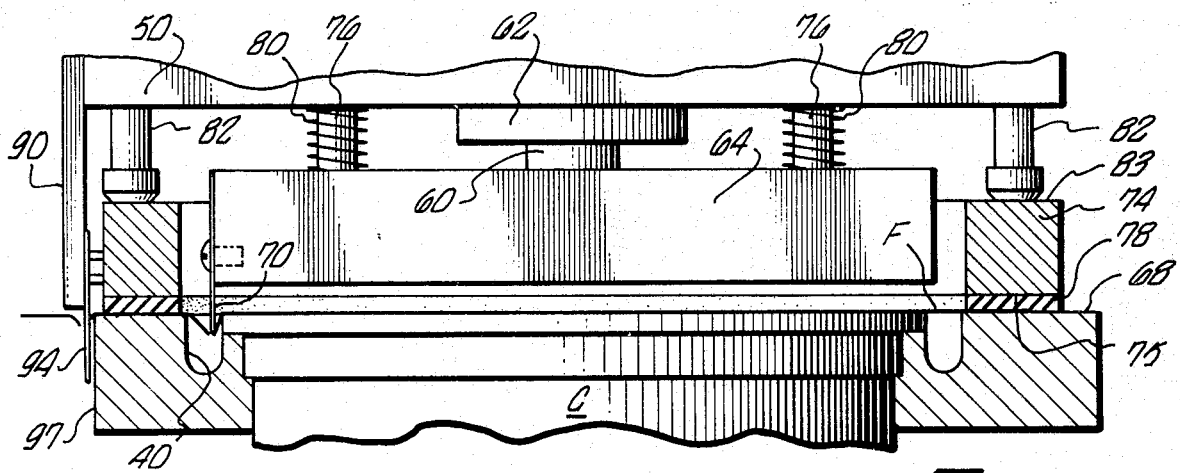
FIG. 4 is a fragmentary broken-away front sectional view of the cutting blades of the assembly shown in FIG. 1 piercing a film; and, FIG. 5 is a side elevation view of the cutting assembly of FIG. 1 in the up position.

As may be best seen in FIG. 3, a set screw 58 secures guide member 60 to the shaft 56. The guide member is mounted for rotation within bearings 62 which are affixed to the top support plate 50. A rotating blade support bar 64 is secured to the guide member by means of bolt 66. A knife blade 70 is secured to at least one end of the support bar and extends downwardly therefrom. When the cutting device is in its down position, the blade will extend below the top surface 68 of the support clamps and into the annular groove 40 as best shown in FIG. 4.

Figure 5:
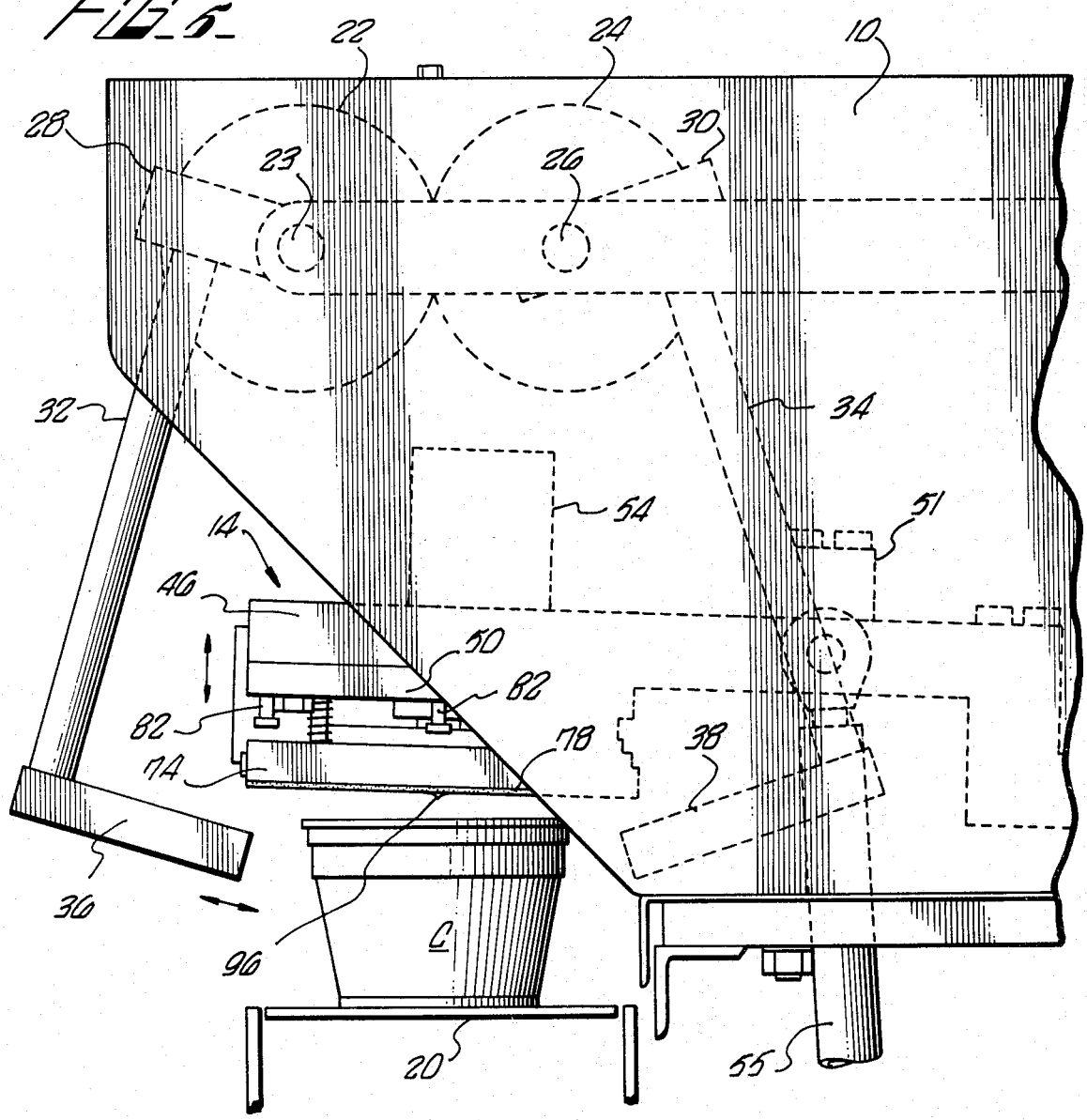

Spaced radially outward from the ends of the rotating support bar 64 is an annular-shaped lower pressure ring 74. This ring is secured to the top support plate by a plurality of fastening means shown as stud bolts 76. The bolts are threadedly fixed to the lower pressure ring and slidably extend through orifices in the top support plate. Each bolt is encircled by a compression ring 80 which forces the ring and plate apart and provides resilience or a cushion when the rocker arm system pushes the cutting device against the shoulder clamps. Each bolt has a head portion larger than the plate orifice for abutment with said plate. In this manner the maximum distance of separation between the pressure ring and support plate is defined. Such occurs when the cutting means is in its up position as shown in FIG. 5 with the compression springs maintaining the separation. The top support plate also includes a plurality of adjustable abutment means shown as shoulder bolts 82. These bolts set the minimum separation in the downward position between the top support plate and lower pressure ring. They also serve, when properly adjusted, to increase the downward pressure against the lower pressure ring whenever it is desired to increase such beyond that provided by the compression springs 80.

The lower surface of the pressure ring is preferably provided with a resilient gasket material such as rubber, cork, plastic or the like. This gasket helps to prevent the film from slipping or becoming displaced during the cutting process.

Affixed to one side of the cutting means is a side plate 90 to which is secured a transverse cutting blade 94. The edge of this blade has a lower central midpoint from which extend slightly upwardly inclined opposing straight edges reaching the outer vertical sides of the blade. The central point 96 serves to pierce the film as the cutting device moves into its downward position. The cutter plate is secured by bolt 95 to the outer side of rocker arm 47. It will be noted that the transverse blade is positioned outside the pressure ring at a location closely adjacent the outer edge 97 of the support clamps. This is to obtain a clean cut of the film web using the edge 97 as a sheering or cutting support. The length of the transverse blade must be at least wider than the diameter of the container top to effect complete severance of the film from the continuous web of film to which are secured subsequent containers. Such would occur when the invention is used on an assembly line operation whereby a roll of film is secured to the tops of successive containers to seal the contents therein.

Referring now to FIG. 5 and discussing the operation of the present invention, spur gears 22,24 are activated to rotate outwardly the support clamps 36,38. Since the teeth of the spur gears are intermeshed it is clear that only one of the gears need be rotated to affect the rotation and movement of the other. This rotation may be accomplished by any drive means known in the art such as a cam operated connecting rod mechanism similar to that utilized for the cutting means. Similarly, equivalent means such as electric motors or mechanical eccentric devices could be used.

With the support clamps swung outwardly and the cutting device in an up position, a container may be placed beneath the device. This may be accomplished by the intermittent movement of an endless conveyor in a machine such as one for packaging food. In such a case a continuous web of plastic film shown as F in FIG. 4 will be heat sealed to the top edges of successive containers as they move through the assembly line.

With the container in position and the film F attached thereto, the support clamps rotate inwardly upon being activated by an electric eye mechanism or the like which detects the position of the container. With the support clamps encircled about the periphery of the container top, the rocker arm system is activated by mechanical or electrical means known in the art. Connecting rod 55 oscillates down which causes the rocker arms 46,47 to pivot about shaft 43 and move the cutting means 14 down against the support clamps. It will be noted at this point that the lower surface 75 of pressure ring 74 will be level with or slightly below the lower most point 96 of transverse knife blade 94. In this manner the bottom of the ring and/or gasket 78 will engage the film and prevent its displacement prior to contact with the transverse blade. It is to be understood that this sequence is not always necessary in that some film materials may have a certain amount of structural integrity such as foils, heavy plastics, coated or laminated films, papers or the like, such that it would not be necessary to provide a prior retention to prevent tearing or dislodgement.

It will be understood that the purpose of the transverse blade 94 is to cut the continuous web of film transversely of its length and thereby sever the container from successive containers that subsequently follow. If the invention is not used in such an assembly line operation the transverse blade may be eliminated.

As the cutting device continues to be lowered, the drive means 54 is activated to rotate the blade support bar 64. It is desirable to have the blade 70 spinning as it enters and pierces the film F as shown in detail in FIG. 4. The blade is affixed to at least one end of the bar 64 and extends below the bottom surface thereof. This allows the blade to freely pierce the film and extend into the clamp groove 40. As the cutting device lowers, the compression springs 80 push the lower pressure ring against the film and hold it securely while the blade 70 rotates within groove 40 at least 360° to effect a complete substantially circular cut of the film adjacent the outer edge of the top of the container. At the lowermost down position, the abutment means 82 will be in contact with the top surface 83 of the lower pressure ring. To increase the downward pressure of the pressure ring and gasket against the film beyond that provided by the compression springs, one may lengthen the amount of each abutment means extending from the support plate. When using threaded shoulder bolts this may be accomplished by simply slightly unscrewing each bolt. In this manner the force from the connecting rod 55 will be transmitted through each bolt directly to the pressure ring.

After the cutter has rotated at least 360°, the process is reversed. The drive means 54 is deactivated and the cutting device is raised upwardly by an upward movement of the connecting rod 55. About simultaneous therewith, the spur gears are activated to swing apart the support clamps 36 and 38. The container is now free to move to the next station downstream or be removed from its location beneath the cutting assembly. The leftover scrap film is conveniently removed by vacuum means not shown.

While the invention has been described with respect to a preferred embodiment, it will be apparent to those skilled in the art that various modifications and improvements may be made without departing from the scope and spirit of the invention. Accordingly it is to be understood that the invention is not to be limited by the specific illustrative embodiment but only by the scope of the claims.

what is claimed is:

1. A method of trimming a web of film which has been attached to the top of a container with a cutting assembly comprising:

positioning a container with a film attached to and extending beyond its top edges beneath a cutting assembly;

moving opposing semicircular-shaped clamps about the top peripheral portion of the container to hold said container and encircle said top portion beneath the film;

moving a spring-biased pressure ring over said film and pressing the film against the top of said clamps; and, moving a rotating knife blade through said film to define a 360° cut about the top outer periphery of said container.

2. The method of claim 1 including the step of passing a stationary blade through the film across the width of said film about simultaneous with the 360° rotary cutting step.

* * * * *